Jan. 23, 1934.    A. B. STARR    1,944,473
TOASTER DEVICE
Filed March 5, 1930    3 Sheets-Sheet 1

INVENTOR
Alden B. Starr
BY
M. Theodore Simmons
ATTORNEY

Jan. 23, 1934.    A. B. STARR    1,944,473
TOASTER DEVICE
Filed March 5, 1930    3 Sheets-Sheet 2

INVENTOR
Alden B. Starr
BY
ATTORNEY

Jan. 23, 1934.    A. B. STARR    1,944,473
TOASTER DEVICE
Filed March 5, 1930    3 Sheets-Sheet 3

INVENTOR
Alden B. Starr
BY
ATTORNEY

Patented Jan. 23, 1934

1,944,473

UNITED STATES PATENT OFFICE 1,944,473

TOASTER DEVICE

Alden B. Starr, Brooklyn, N. Y., assignor to Knapp-Monarch Company, a corporation of Missouri Application March 5, 1930. Serial No. 433,472

9 Claims. (Cl. 161—16)

My invention relates to toaster devices of the traveling conveyor type, and more particularly to new and improved means and mechanism for the operation thereof.

One object of my invention is the production of a new and improved electromagnetic actuating motor drive for the conveyor of my toaster device.

Another object of my invention is the production of a new and simplified device for controlling the actuation of a conveyor chain in a toaster device.

Still another object of my invention is the provision of an electromagnetic driving motor and means for intermittently energizing the same at definite and regular intervals during the entire period of use thereof.

A further object of my invention is the control of an electromagnetic actuating motor by mechanically actuated circuit making and breaking device.

A still further object of my invention is the provision in combination with the aforementioned mechanical control of means for adjusting the stroke of said motor to vary the speed of operation of the conveyor being moved thereby.

A still further object of my invention is to provide an electromagnetic motor drive for operating the aforementioned toaster in which all noise of the electromagnetic motor is eliminated.

An even further object of my invention is to provide in a device of the above described character an electromagnetic motor with control means therefor of such a character as to render the operation of the motor silent.

Still further objects of my invention are the simplification of a conveyor toaster drive mechanism, the production of a balance wheel mechanism for actuating the electromagnetic driving motor for the conveyor, a new and simplified mounting means for the operating mechanism of such a toaster device, and a new and useful method of controlling the speed of traverse of the conveyor chain.

More specifically, my invention utilizes a frame work in which is mounted a heater device, guides therebetween for a toastable material, a conveyor chain for carrying the material past the heater device, and a new and convenient drive mechanism for the conveyor chain. The drive mechanism consists of a ratchet upon one of the conveyor chain sprocket wheels, a pawl, an electromagnet adapted to the operation thereof, and a mechanical circuit making and breaking device for the energization and deenergization at regulated intervals of the coil of the electromagnet. The circuit interrupter consists of an oscillating fly wheel or balance wheel device having a contact mounted thereon, and cooperating with a contact and impulse device attached to the electromagnet armature whereby the balance wheel is set into operation to open the contact after a definite time, hold it open for a specified time, and thereafter the balance wheel is spring returned to reclose the contact which is reopened by the next cyclic movement. The cyclic opening and closing of the circuit through the magnet coil strokes the magnet armature, actuates the pawl and ratchet, and drives the conveyor chain.

By my invention I am thus enabled to provide a new, convenient and inexpensive motive device for a conveyor type toaster.

Other objects and structural details of my invention will be apparent from the following description when read in connection with the accompanying drawings, wherein—

Figure 1:
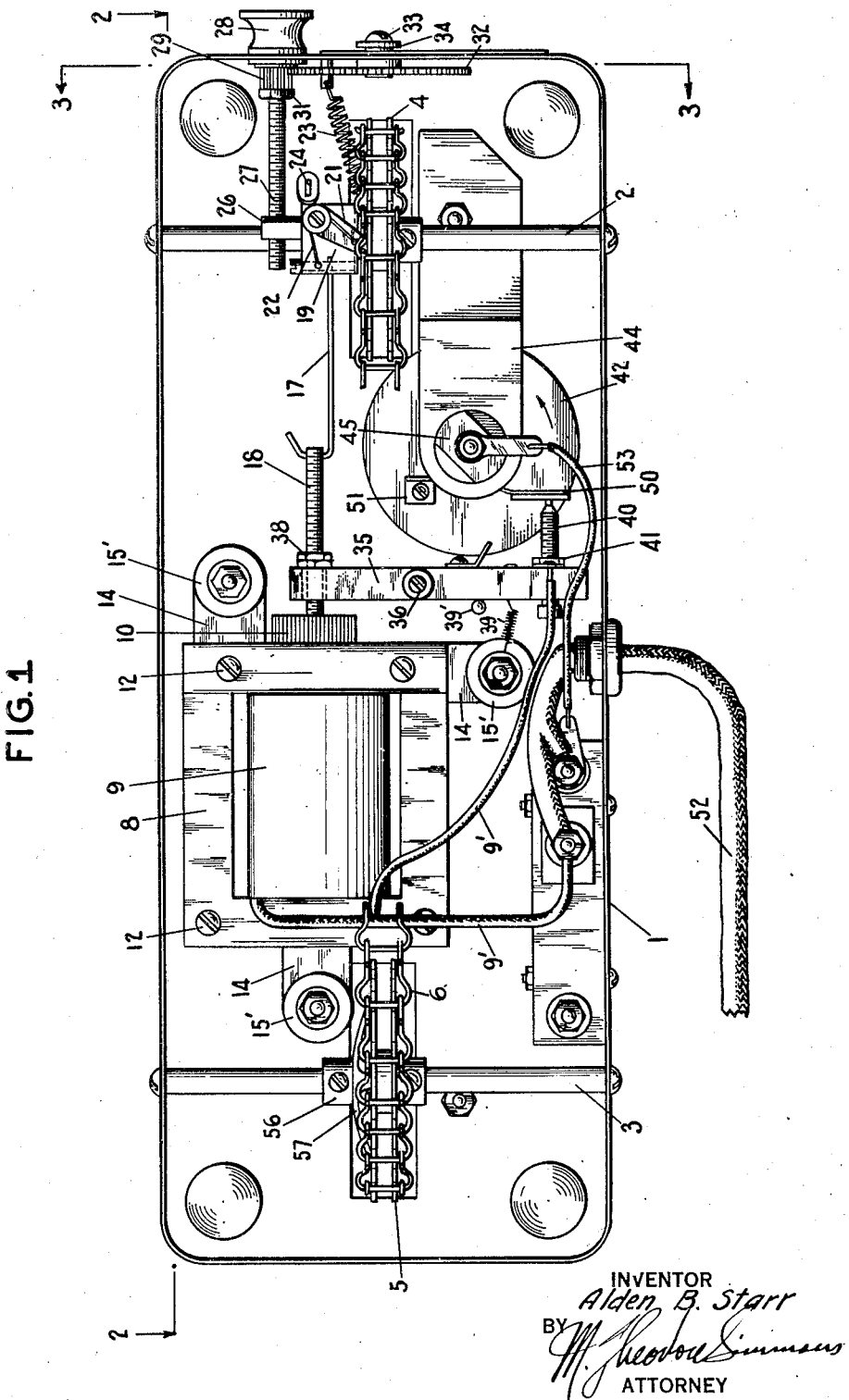
Figure 1 is a bottom view of my toaster device with the bottom plate removed and showing the actuating mechanism.

Referring to the figures, I provide a foundation base member 1 upon which is mounted a casing 1A within which are positioned opposed heater elements and appropriate horizontal guiding elements for the bread or toastable material as it is conveyed between the heaters.

Within the base 1 are positioned shafts 2 and 3 upon which are rotatably mounted pairs of sprocket wheels 4 and 5 upon which a conveyor chain 6 is positioned.

I further provide an electromagnet for operating the conveyor chain, the electromagnet having a laminated frame 8, a coil or winding 9, and an armature or plunger 10. The laminations of the frame 8 are held together by rivets or screws 12 by which supporting ears 14 are attached to the frame for mounting the electromagnet in place.

The ears 14 engage with supporting posts 15 and cooperating collars 15', the whole assembly being secured to the base 1 by means of appropriate screws or bolts. The elements 15 and 15' may be composed of rubber or other resilient material which has the dual advantage of absorbing vibrations to reduce noise of operation of the electromagnet and facilitate proper aligning of the electromagnet coil and armature or plunger.

The rotation of the sprocket wheels and movement of the chain is through a pawl and ratchet actuated by the electromagnet, and this mechanism will now be described.

Figure 2:
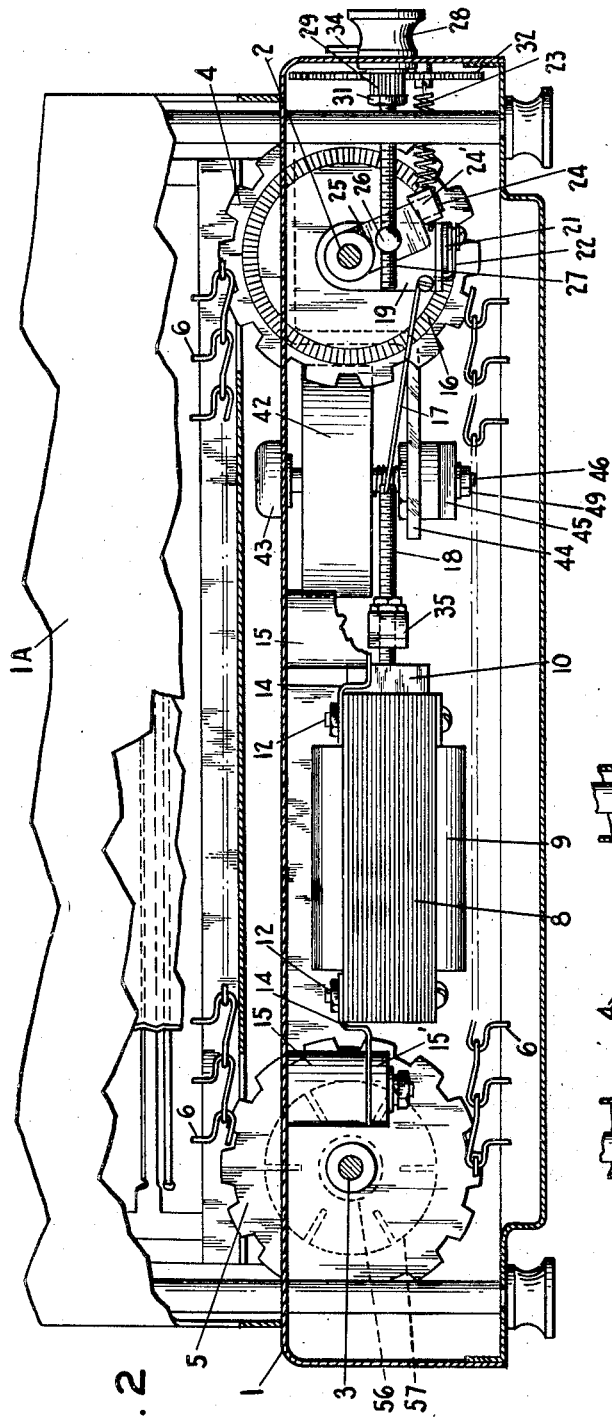
Fig. 2 is a side view in vertical section on the line 2—2 of Fig. 1.
Figure 6:
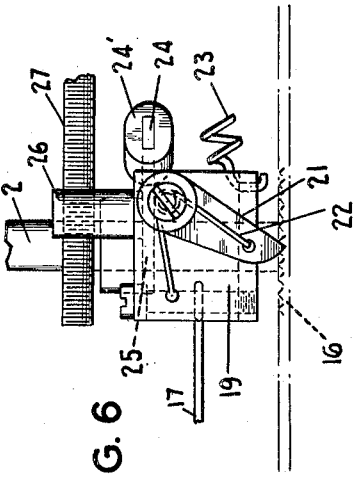
Fig. 6 is an enlarged bottom view (as in Fig. 1) of the adjustment mechanism for varying the speed of the conveyor chain.
Figure 3:
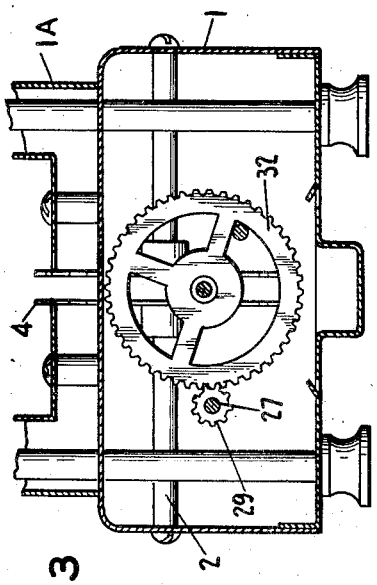
Fig. 3 is a partial end view in vertical section on the line 3—3 of Fig. 1, parts being omitted to facilitate the illustration.
Figure 4:
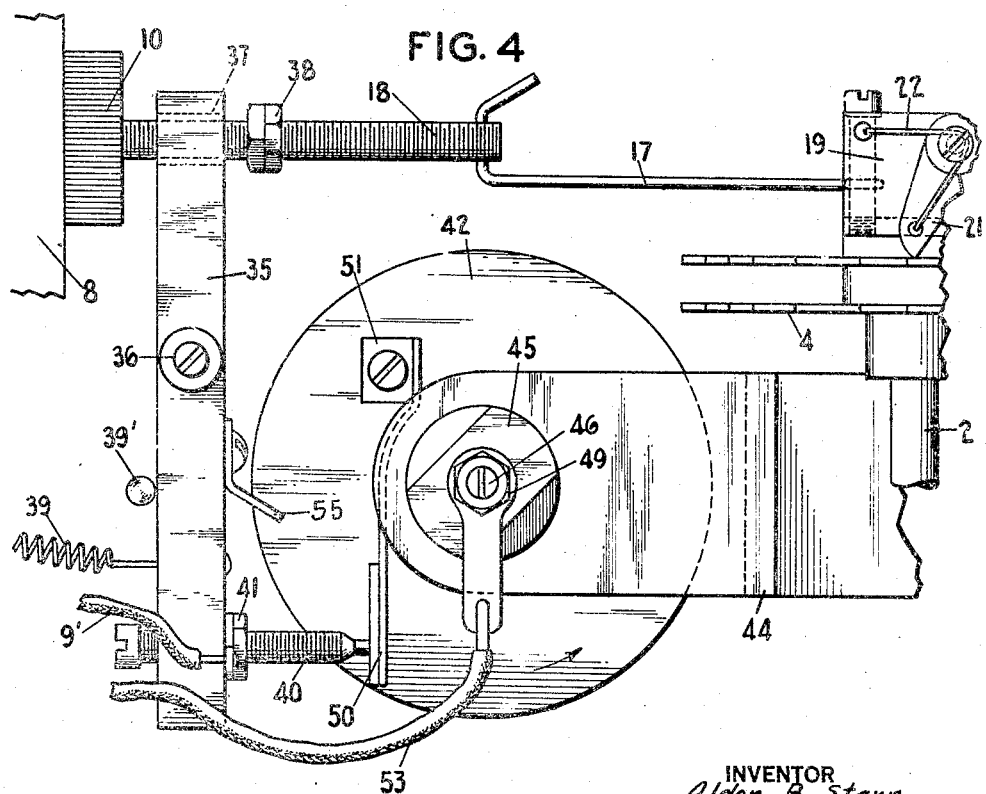
Fig. 4 is an enlarged bottom view (as in Fig. 1) of the balance wheel and operating mechanism of the device of my invention.

One of the sprockets 4 is provided with a circular path of fine teeth or knurlings 16 comprising a ratchet. A swinging arm 19 is journaled upon the shaft 2 (Fig. 2) and positioned adjacent to the ratchet sprocket wheel 4. Arm 19 carries a pawl 21, which is held against the ratchet 16 by the pressure of spring 22. The arm 19 is connected to the movable plunger 10 of the electromagnet through a link 17 and a rod 18 (Fig. 4). The arm 19 is pulled away from the electromagnet by a spring 23, and through the spring held against a stop 24, that may be padded with a bit of rubber tubing 24' as shown, and which is carried upon a second swinging arm 25 journaled upon a shaft 2.

The stop is adjustable as follows: An arm 26 projects outwardly from the swinging arm 25 and is screw threaded to constitute a nut cooperating with a threaded screw member 27. The screw 27 is provided with a head or knob 28 and a pinion 29, cooperating with the metal of the case 1, the pinion 29 being located upon one side of the case, and the knob 28 upon the other side, the relative position of the two being maintained by lock nut 31.

A gear 32 meshes with the pinion 29, and is journaled upon a bearing in the case member 1 held in position by means of a screw 33 to which is also attached a pointer 34, which is adapted to cooperate with graduations or other indicating devices upon the exterior of the case 1 in a fashion which is obvious but not shown in the drawings.

Figure 5:
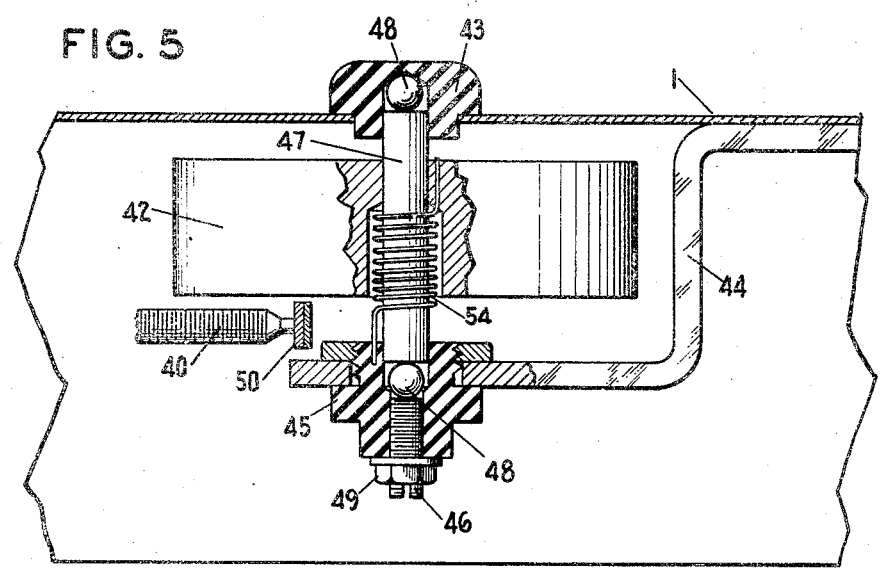
Fig. 5 is an end view of the balance wheel and its mounting, parts being in section and parts broken away to facilitate the showing.

The mechanism for intermittently energizing the electromagnet comprises a circuit interrupter consisting of a rocker arm 35, shown in detail in Fig. 5, which is formed of suitable insulation material and is pivoted upon a screw or bearing 36. One end of the arm 35 has an opening 37 therethrough, within which the arm 18 attached to the armature 10 is freely movable. A pair of nuts 38 are adjustable along arm 18 and serve to actuate the arm 35 when the armature 10 is pulled inwardly. A spring 39 serves to return the arm to its normal position against stop 39' when the arm 18 and nuts 38 are withdrawn as will be described hereinafter.

In the free end of the arm 35 is positioned a contact carrying screw 40 adjustably held in a fixed position by a lock nut 41. A balance wheel 42 is positioned adjacent the arm member 35 and held upon appropriate pivots, as indicated in detail in Fig. 5. The pivots may desirably comprise a suitable cup 43, which may be formed of molded composition such as bakelite, or may be formed of other insulating material and is shown mounted in the metal of the foundation base 1. The lower pivot is desirably carried by a bracket member 44, which also is secured to the base member 1, and consists of a cup 45, composed of insulating material and provided with an adjusting screw 46. The balance wheel 42 has a shaft 47 journaled in each of the cups 43 and 45 in which are also mounted ball bearing members 48 located at the ends of the shaft 47, so that the shaft turns freely upon the balls 48. Any slack is taken up by adjustment of the screw 46, which is held in adjusted position by lock nut 49. If desired, a small quantity of mercury may be positioned in either or both of the chambers containing the ball bearings 48, partially as a lubricant, and also to insure a better electrical connection at all times, for purposes hereinafter described.

A coiled spring 54 is positioned within a recess in the balance wheel 42, as indicated. One end of the spring 54 is attached to the balance wheel 42, and the other end is attached to cup 45, although any appropriate portion of the bracket 44 is equally suitable.

Upon the balance wheel 42 is mounted a contact carrying member 50, which is desirably of spring metal. The arm is secured to the wheel 42 by the screw and block arrangement 51, as indicated in Fig. 4. The spring 54 is so adjusted that contacts 40 and 50 are maintained together when the mechanism is in its normal position of rest.

A cable 52 is connected to an appropriate source of electric current, such as any household socket outlet, and leads the electric current to the opposed heaters in the toaster oven, in manner well known but not shown. The circuit to the coil 9 of the electromagnet is in parallel. One of the terminal wires 9' of the coil 9 is connected directly to one of the leads from the cable 52 and the other terminal wire 9' of the coil 9 is connected to the contact 40. The other lead of the power supply cable 52 is connected by wire 53 to the bearing screw 46 in the cup 45, as indicated, and by the metallic connection through the screw 46, ball bearing 48, shaft 47, and the fly wheel 42 to the contact 50.

In the operation of my device, current from the cable 52 flows through the heaters as previously described. Simultaneously current flows through the normally closed contacts 40 and 50 of the actuating mechanism of my invention to the electromagnet coil 9. The presence of current in the coil 9 develops a magnetic field, which draws the armature 10 within the coil 9 and exerts a pull upon the bar 18 and the link 17, causing a movement thereof. This movement is transmitted to the pawl 21 which cooperating with the ratchet teeth 16, causes a movement of the associated sprocket 4 and with it the conveyor chain 6. Simultaneously, the rocker arm 35 is moved, by engagement of the nuts 38 therewith the impulse being transmitted through the contact carrier 40 to contact carrier 50, which, by reason of the positions of these parts, imparts a rotary movement to the balance wheel 42 in the direction of the arrow in Figs. 1 and 4. After the movement is under way, the inertia of the moving wheel 42 carries it beyond the position to which it is pushed by the pressure upon the contacts 40 and 50, and the contacts are accordingly separated. The separation of these contacts breaks the circuit therethrough and deenergizes the coil 9, thus allowing the spring 23 to pull the pawl carrying arm 19 and armature 10 to their original positions against the stop 24. This allows the spring 39 to return the arm 35 and contacts 40 to normal position.

The balance wheel 42 may continue to move until the kinetic energy imparted to it by the above described impulse is completely converted into tension in the spring 54, or the movement may be limited by the engagement of block 51 with the flexible stop 55 carried on arm 35.

The tension in the spring then returns the wheel 42 to its original position, reclosing the contacts 40 and 50. This immediately reestablishes the circuit to the coil 9 and current flows therein, whereupon the armature 10 is again pulled within the coil, and the above mentioned cycle of operation is repeated, thereby moving the sprocket 4 another small distance. Thus, the conveyor chain 6 and any toastable material which may be positioned thereon, such as bread, is moved past the opposed heaters. This sequence of operations will be continued as long as current is supplied to energize the coil 9 when the contacts 40 and 50 are closed.

One means to prevent movement of the chain 6 backwards when pawl 21 is being returned to its starting position by spring 23 is shown as a friction disc 57 engaging sprocket wheel 5 and held in place by collar 56.

The mechanical making and breaking of the circuit to the electromagnet insures the definite regular impulses thereof at recurrent intervals without variation throughout the entire period of operation of the toaster unaffected by any condition of heat accumulation in the base 1, etc.

Furthermore, in the operation of the electromagnets there is a well defined "singing" or hum, particularly when operated upon alternating current, each time the plunger is drawn into the sheath and seated upon the stop therefor. The hum is due to imperfect seating of the plunger making it responsive to the alternating cycles of the current. Various ways and means have been devised and suggested for the elimination of this hum, which is an objectionable noise particularly in household articles.

I propose to eliminate this objectionable hum through the balanced operation of my control device for the electromagnet.

That is to say, the breaking of the circuit at the contacts 40 and 50 occurs either just prior to the seating of the plunger 10 upon its stop (not shown) or substantially simultaneously with the seating of the plunger. If the circuit is broken prior to the seating, the momentum of the armature is sufficient to seat the plunger. In either event, the result is that at the time the plunger reaches its seat upon the stop there is no current flowing in the coil of the electromagnet and therefore no magnetic lines of force in the frame 8 and the armature 10. Without current present when the armature is seated upon the stop, there can be no hum incident to the imperfect or incomplete seating such as occurs in electromagnets of general construction and in general uses.

My arrangement has a further advantage in reducing heating in the electromagnet. In each instance the contact for the energization of the electromagnet is momentary and substantially instantaneously broken so that the electric forces are interrupted after this momentary contact. With this arrangement eddy currents, etc., cannot build up and accumulate to an extent sufficient to unduly heat up the electromagnet or the armature, as is a common occurrence in electromagnets of ordinary construction and ordinary uses. Hence, if desired, a solid plunger 10 can be used in place of the laminated plunger shown in the drawings herein, and no provisions have to be made for maintaining the electromagnet cool.

The speed of traverse of the conveyor chain 6 is governed by the adjustment of the stop 24, which is done by turning the knob 28 to adjust the position of the screw 27 in the nut 26. When the stop 24 is carried towards the magnet 8, only a short stroke of the pawl 21 is permitted. Accordingly, each movement of the balance wheel 42 and ensuing cycle of operation causes only a small movement of the chain 6. The chain will take longer to traverse the length of the toaster, and thereby a dark toast is obtained. When the stop 24 is pulled away from the magnet structure 8, the spring 23 causes the pawl carrying arm 19 and associated link 17 and arm 18 to follow the stop, so that a maximum stroke of the pawl 21 is permitted, and the maximum movement of the conveyor chain 6 is obtained for each cycle of the balance wheel 42. Accordingly, the toast is conveyed through the toaster at a fairly high rate of speed, and a light toasting is obtained.

It will be noted however, that the stroke imparted to the rocker arm 35 and balance wheel 42 is not varied for the reason that the rocker arm does not follow when the nuts 38 are withdrawn from engagement therewith. The stop 39' prevents that. With the rocker arm 35 maintained in a predetermined position, and not moved until the nuts 38 engage it, varying the position of the nuts 38, by the adjustment of stop 24, at the start of the forward movement thereof has no effect on the impulse imparted to the arm 35 because the length of the stroke past the predetermined position of the arm 35 is always the same.

It may be noted that by this device, a series of strokes of the magnet armature 10 are obtained at regular intervals, and that the adjustment of the rate of travel of the conveyor chain 6 is obtained by adjusting the length of each of the regularly recurring strokes of the actuating motor.

By my invention I have produced a new and useful toaster device incorporated a new and simplified and convenient type of actuating drive for the traversing of a conveyor chain therein. This embodiment of my invention is particularly convenient because of the durability, ruggedness and simplicity of its operating mechanism.

Certain subject matter is shown but not claimed herein, the same being covered in my copending application Ser. No. 429,088, filed February 17, 1930, now Patent No. 1,894,430, granted Jan. 17, 1933.

While I have shown but a simple embodiment of the device of my invention, it is capable of various modifications therefrom without departure from the spirit thereof, and I desire therefore that such modifications shall be covered by the appended claims.

I claim:

1. In combination, a conveyor chain, sprocket wheels for the support thereof, one of said sprockets having ratchet teeth thereon, a pawl cooperating therewith, an electromagnet having a frame, a coil, and an armature, linkage between said armature and said pawl, and means for the opening of the circuit to said coil comprising a pair of contacts, a balance wheel, one of said contacts being mounted upon said balance wheel, and a pivoted arm, the other of said contacts being supported thereby.

2. In combination, a conveyor chain, sprocket wheels for the support thereof, one of said sprockets having ratchet teeth thereon, a pawl cooperating therewith, an electromagnet having a frame, a coil, and an armature, linkage between said armature and said pawl, and means for the opening of the circuit to said coil comprising a pair of contacts, a balance wheel, one of said contacts being mounted upon said balance wheel, and a pivoted arm, the other of said contacts being supported thereby, said arm being actuated from said linkage and actuating said balance wheel.

3. In combination, a conveyor, sprocket wheels for the support and movement thereof, pawl and ratchet mechanism cooperating therewith, an electromagnet having a winding and an armature, linkage between the armature and the pawl and ratchet mechanism, a pair of contacts in the circuit of said electromagnet, means for interrupting the circuit through said contacts comprising an oscillatory balance wheel, a pivoted arm for actuating the balance wheel, the arm having a normal position and being actuated from said linkage, and means for varying the linkage to vary the operation of said conveyor without varying the movement of said arm by the linkage.

4. In combination, a conveyor, sprocket wheels for the support and movement thereof, pawl and ratchet mechanism cooperating therewith, an electromagnet having a winding and an armature, linkage between the armature and the pawl and ratchet mechanism, a pair of contacts in the circuit of said electromagnet, means for interrupting the circuit through said contacts comprising an oscillatory balance wheel, one of said contacts being carried by the balance wheel, and a pivoted arm carrying the other of said contacts and actuated from said linkage to actuate the balance wheel, the arm and balance wheel having a normal position with said contacts closed, to which position the parts return after each actuation of the balance wheel.

5. In combination, a conveyor, sprocket wheels for the support and movement thereof, pawl and ratchet mechanism cooperating therewith, an electromagnet having a winding and an armature, linkage between the armature and the pawl and ratchet mechanism, a pair of contacts in the circuit of said electromagnet, means for interrupting the circuit through said contacts comprising an oscillatory balance wheel, one of said contacts being carried by the balance wheel, a pivoted arm carrying the other of said contacts and actuated from said linkage to actuate the balance wheel, the arm and balance wheel having a normal position with said contacts closed, to which position the parts return after each actuation of the balance wheel, and means for varying the linkage to vary the operation of the conveyor, the adjustment of the linkage being such as not to disturb the amount of movement of the arm in actuating the balance wheel.

6. In a toaster, a casing, opposed heating elements mounted therein, a conveyor having one lap thereof passing between the heating elements for carrying slices of bread therebetween, and a base housing mechanism for actuating said conveyor, the mechanism comprising sprocket wheels for the support of said conveyor, one of said sprockets having ratchet teeth thereon, a pawl cooperating therewith, an electromagnet having a frame, a coil, and an armature, linkage between said armature and said pawl, and means for the opening of the circuit to said coil comprising a pair of contacts, a balance wheel, one of said contacts being mounted upon said balance wheel, and a pivoted arm, the other of said contacts being supported thereby, said arm being actuated from said linkage and actuating said balance wheel.

7. In a toaster, a casing, opposed heating elements mounted therein, a conveyor having one lap thereof passing between the heating elements for carrying slices of bread therebetween, and a base housing mechanism for actuating said conveyor, the mechanism comprising sprocket wheels for the support and movement of said conveyor, pawl and ratchet mechanism cooperating therewith, an electromagnet having a winding and an armature, linkage between the armature and the pawl and ratchet mechanism, a pair of contacts in the circuit of said electromagnet, means for interrupting the circuit through said contacts comprising an oscillatory balance wheel, one of said contacts being carried by the balance wheel, and a pivoted arm carrying the other of said contacts and actuated from said linkage to actuate the balance wheel, the arm and balance wheel having a normal position with said contacts closed, to which position the parts return after each actuation of the balance wheel.

8. In a toaster, a casing, opposed heating elements mounted therein, a conveyor having one lap thereof passing between the heating elements for carrying slices of bread therebetween, and a base housing mechanism for actuating said conveyor, the mechanism comprising sprocket wheels for the support and movement of said conveyor, pawl and ratchet mechanism cooperating therewith, an electromagnet having a winding and an armature, linkage between the armature and the pawl and ratchet mechanism, a pair of contacts in the circuit of said electromagnet, means for interrupting the circuit through said contacts comprising an oscillatory balance wheel, one of said contacts being carried by the balance wheel, a pivoted arm carrying the other of said contacts, and actuated from said linkage to actuate the balance wheel, the arm and balance wheel having a normal position with said contacts closed, to which position the parts return after each actuation of the balance wheel, and means for varying the linkage to vary the operation of the conveyor, the adjustment of the linkage being such as not to disturb the amount of movement of the arm in actuating the balance wheel.

9. In a toaster device, a conveyor chain, heater members cooperating therewith, and an electromagnet drive for the chain and comprising a magnetic frame, a coil, an armature, and actuating linkage between said conveyor chain and armature, and means for cyclically energizing and deenergizing said coil comprising a pair of contacts, and an oscillatory balance wheel for the actuation thereof, one of said contacts being moved by movement of said armature, and the other of said contacts being resiliently mounted upon said balance wheel and adapted to be moved by the first mentioned contact.

ALDEN B. STARR.